United States Patent
Wang et al.

(10) Patent No.: US 8,365,102 B2
(45) Date of Patent: Jan. 29, 2013

(54) METHOD FOR CHECKING AND FIXING DOUBLE-PATTERNING LAYOUT

(75) Inventors: Dio Wang, Taiping (TW); Ken-Hsien Hsieh, Taipei (TW); Huang-Yu Chen, Zhudong Township (TW); Li-Chun Tien, Tainan (TW); Ru-Gun Liu, Hsinchu (TW); Lee-Chung Lu, Taipei (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 12/788,789

(22) Filed: May 27, 2010

(65) Prior Publication Data

US 2011/0296360 A1 Dec. 1, 2011

(51) Int. Cl.
*G06F 17/50* (2006.01)
(52) U.S. Cl. ............. 716/51; 716/52; 716/54; 716/55; 716/50
(58) Field of Classification Search .................. None
See application file for complete search history.

(56) References Cited

U.S. PATENT DOCUMENTS

| | | | |
|---|---|---|---|
| 2009/0217224 A1 | 8/2009 | Wiaux et al. | |
| 2010/0153905 A1 | 6/2010 | Maeda | |
| 2010/0196803 A1* | 8/2010 | Lu et al. | 430/5 |
| 2011/0023002 A1* | 1/2011 | Cheng et al. | 716/126 |
| 2011/0078638 A1* | 3/2011 | Kahng et al. | 716/52 |
| 2011/0119648 A1* | 5/2011 | Chen et al. | 716/126 |
| 2011/0197168 A1 | 8/2011 | Chen et al. | |
| 2011/0219341 A1* | 9/2011 | Cao et al. | 716/50 |
| 2012/0110521 A1 | 5/2012 | Agarwal et al. | |

OTHER PUBLICATIONS

Yang et al., A New Graph-Theoretic, Multi-objective Layout Decomposition Framework for Double Patterning Lithography, Proceedings of the 2010 Asia and South Pacific Design Automation Conference, pp. 637-644, Mar. 2010.*

Arnold, William, "Towards 3nm Overlay and Critical Dimension Uniformity: An Integrated Error Budget for Double Patterning Lithography", Optical Microlithography XXI, Proc. of SPIE vol. 6924, 692404, (2008).

* cited by examiner

*Primary Examiner* — A. M. Thompson
(74) *Attorney, Agent, or Firm* — Lowe Hauptman Ham & Berner, LLP

(57) ABSTRACT

A method and system checks a double patterning layout and outputs a representation of G0-rule violations and critical G0-spaces. The method includes receiving layout data having patterns, determining whether each distance between adjacent pattern elements is a G0-space, find all G0-space forming a G0-rule violation, finding all G0-space that are critical G0-spaces, and outputting a representation of G0-rule violations and critical G0-spaces to an output device. By resolving G0-rule violations and critical G0-spaces, a design checker can effectively generate a double patterning technology (DPT) compliant layout.

21 Claims, 16 Drawing Sheets

METHOD FOR CHECKING AND FIXING DOUBLE-PATTERNING LAYOUT

TECHNICAL FIELD

The present disclosure relates to semiconductor fabrication generally and more specifically to double patterning.

BACKGROUND

In semiconductor fabrication processes, the photo resolution of a photoresist pattern begins to blur at about 45 nanometer (nm) half pitch. As feature sizes decrease to 20/22 nm and beyond, various methods are used to address the resolution issue. Particularly, double exposure techniques may be used to maintain resolution using two masks.

Double exposure involves forming patterns on a single layer of a substrate using two different masks in succession. As a result, line spacing in the combined pattern can be reduced while maintaining good resolution. In a method referred to as double dipole lithography (DDL), the patterns to be formed on the layer are decomposed and formed on a first mask having only horizontal lines, and on a second mask having only vertical lines. The first and second masks are said to have 1-dimensional (1-D) patterns, which can be printed with existing lithographic tools.

Another form of double exposure is referred to as double patterning technology (DPT). Unlike the 1-D approach of DDL, DPT in some cases allows a vertex (angle) to be formed of a vertical segment and a horizontal segment on the same mask. Thus, DPT generally allows for greater reduction in overall IC layout than DDL does. DPT is a layout splitting method analogous to a two coloring problem for layout splitting in graph theory. In its simplest form, the two coloring problem is a way of coloring the vertices (or edge or face) of a graph such that no two adjacent vertices share the same color. Two adjacent vertices connected with an edge should be assigned different colors. Only two "color types" can be assigned. If a 2 color solution exists, the graph is said to be 2-colorable.

An IC layout includes multiple patterns on many layers. The distance between adjacent elements may be too small to be on the same mask, referred to herein as G0-space, but not so small to be beyond the capability of the technology node. Each pattern on a layer is assigned a first or second "color"; the patterns of the first color are formed by a first mask, and the patterns of the second color are formed by a second mask. DPT is computationally intensive because IC layouts have many solutions having different costs, which are evaluated separately. However, many layouts cannot be simply resolved into two masks, i.e. 2-colorable.

FIGS. 1A and 1B show two examples of pattern layouts that present situations that are not 2-colorable. In FIGS. 1A and 1B, the line width is labeled W, the minimum space between lines is labeled S, and the center-to-center pitch between lines is labeled P. The minimum spacing S is a parameter of a particular process technology node; smaller S corresponds to more advanced technology nodes. In FIG. 1A, the segments 50, 52, and 54 form a first pattern 49 with nearby additional patterns 56 and 58. There are three spatial relationships (indicated by dashed lines), which would violate DPT constraints if put in the same mask. Example DPT constraints may include spacing rules, for example, edge of runs must be a further than a certain distance apart, and shape rules, for example, a pattern cannot violate a spacing rule with itself. Spatial relationships that violate DPT constraints when put into the same mask are called G0-space.

In FIG. 1A, patterns 49 and 56 are too close to be put in the same mask, because segment 50 and pattern 56 are too close, violating a spacing rule and forming a G0-space. Thus pattern 49 must be assigned to a different mask from pattern 56. Assigning pattern 49 to mask A, the first mask, and pattern 56 to mask, B, it is noted that patterns 49 and 58 are also too close to be put in the same mask because segment 54 and pattern 58 form another G0-space. Because pattern 49 is already assigned to mask A, then pattern 58 must be assigned to mask B, the second mask. However, patterns 56 and 58 are similarly too close to each other to be put in the same mask, but both are already assigned to the same mask B. Thus, there is no way to distribute the first pattern 49 and the two additional patterns 56 and 58 between two masks A and B without violating a DPT constraint. In terms of graph theory, when the total number of relationships between patterns that violate the minimum spacing for a single mask is odd, an odd cycle is present, and DPT cannot be used without changing the layout.

FIG. 1B shows a similar odd cycle situation. Segments 60, 62 and 64 form a first pattern 59. The patterns 59, 70, 72, 74 and 76 have five relationships (shown by dashed lines) that violate minimum spacing constraints for being formed in the same mask with each other. Because the number of relationships violating the minimum spacing requirements is an odd number, an odd cycle is present, and DPT cannot be used without changing the layout.

Design Rule Checker (DRC) software can systematically check design rules by showing all G0-spaces in a layout design. A designer would enter the necessary design rules, referred to as a deck, into the DRC using its design rule language, such as Standard Verification Rule Format (SVRF) or a software specific Tool Command Language (TCL). The design rules would specify the criteria for a particular spatial relationship to be a G0-space, such as corner-to-corner distance, end-to-end distance, or run-to-end distance. The DRC software would then take the layout input in a standard format, such as Graphic Data System II (GDSII), and produce an output that shows all the spatial relationships that are G0-spaces. Commonly used DRC software includes CALIBRE™ by MENTOR GRAPHICS; HERCULES™ by SYNOPSYS; DIVA™, DRACULA™, ASSURA™, and PVS™ CADENCE DESIGN SYSTEMS.

If a layout cannot be separated into two masks, the problem can be addressed by changing the layout design. The layout design is usually changed manually by a designer reviewing the G0-space output from a DRC software. Changing a layout design is time-consuming, because a designer aims to minimize the total volume of a design and a change often affects structures in other layers. A designer must evaluate many alternate fixes before selecting on the best solution. Additionally, some fixes does not necessarily resolve certain loop combinations. Therefore, improved methods for efficiently resolving DPT constraint violations are desired.

DETAILED DESCRIPTION

Figure 1B:
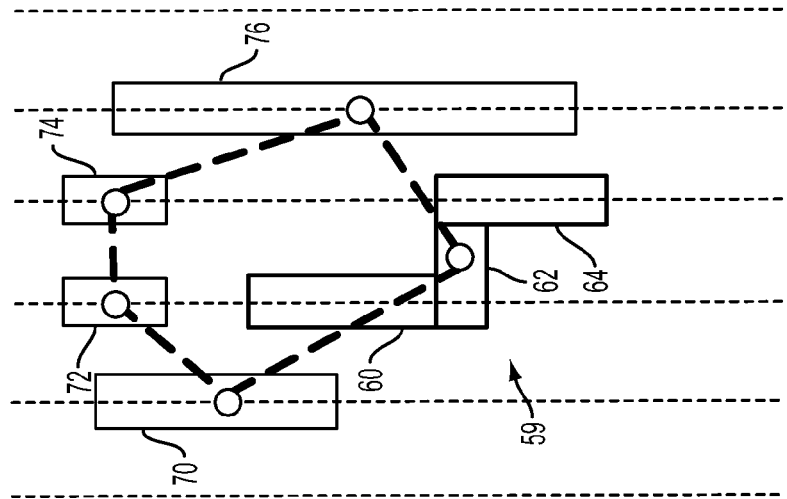
FIGS. 1A and 1B show odd cycle patterns formed in the prior art.
Figure 1A:
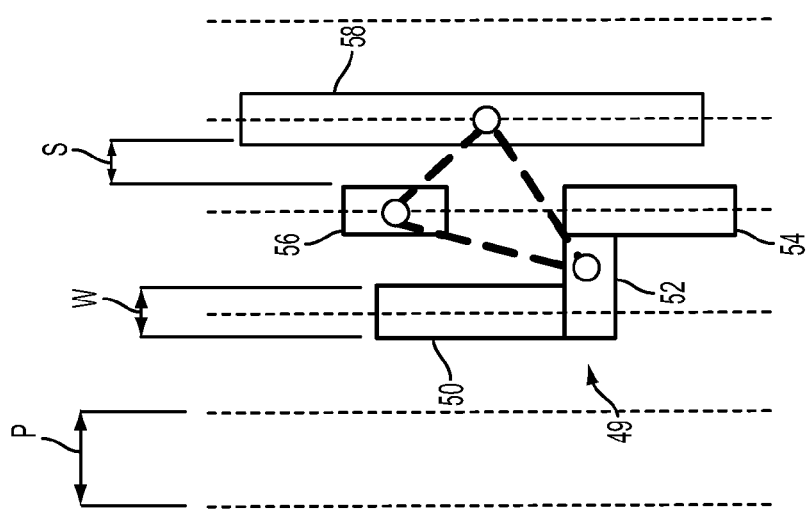

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2:
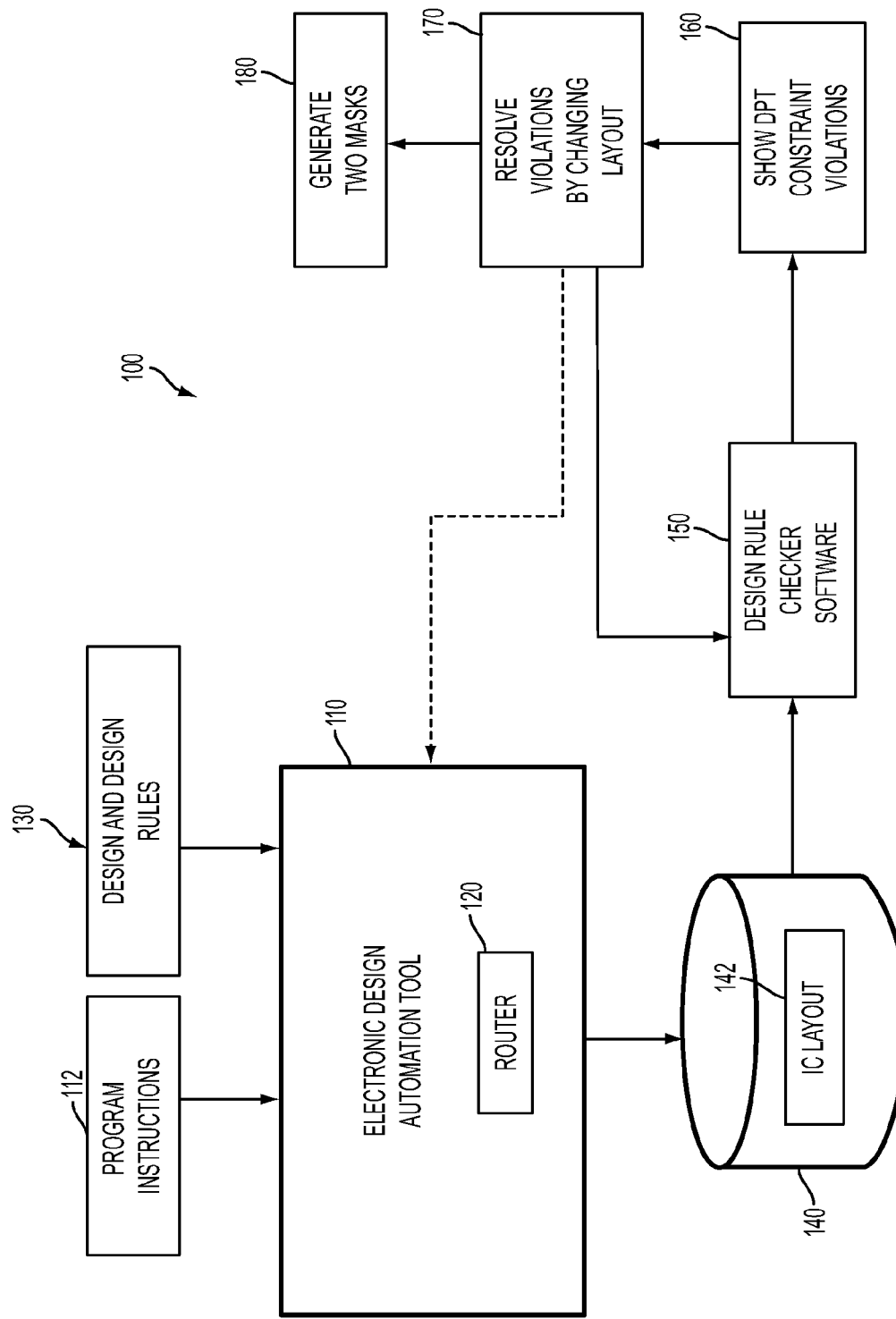
FIG. 2 is a block diagram of a system according to one embodiment.

FIG. 2 shows a system 100 having an electronic design automation (EDA) tool 110 such as "IC COMPILER"™, sold by Synopsis, Inc. of Mountain View, Calif., including a router 120 such as "ZROUTE"™, also sold by Synopsis. Other EDA tools 110 may be used, such as the "VIRTUOSO" custom design platform or the Cadence "ENCOUNTER" ® digital IC design platform may be used, along with the "VIRTUOSO" chip assembly router 120, all sold by Cadence Design Systems, Inc. of San Jose, Calif. The EDA tool 110 is a special purpose computer formed by retrieving stored program instructions from a computer readable storage medium 112 and executing the instructions on a processor.

One or more computer readable storage media 112 and/or 130 are provided to store input data used by the EDA tool 110. The storage medium 130 and/or the storage medium 112 may include one or more of dynamic random access memory (RAM), SDRAM, a read only memory (ROM), EEPROM, a hard disk drive (HDD), an optical disk drive (CD-ROM, DVD-ROM or BD-ROM), or a flash memory, or the like. The input data may include an identification of a plurality of cells to be included in an integrated circuit (IC) layout, including a list of pairs of cells within the plurality of cells to be connected to each other and other design information. The input data may also include design rules. Design rules may include default rules applicable to all designs or rules specific to a particular kind of design or the instant design.

A computer readable storage medium 140 is provided, for outputting an IC layout 142. The medium 140 may be a separate storage device, or a portion of the same storage medium 130 described above. The medium 140 may be any of the types of storage media described above with respect to medium 130.

The IC layout 142 is then checked for DPT compliance by the Design Rule Checker (DRC) software 150 for G0-space.

The G0-space information is outputted in 160 to various output devices such as a printer, a screen, a graphic display device, or the like. Commonly, G0-spaces are simply highlighted in a layout diagram as shown in FIG. 3.

Figure 3:
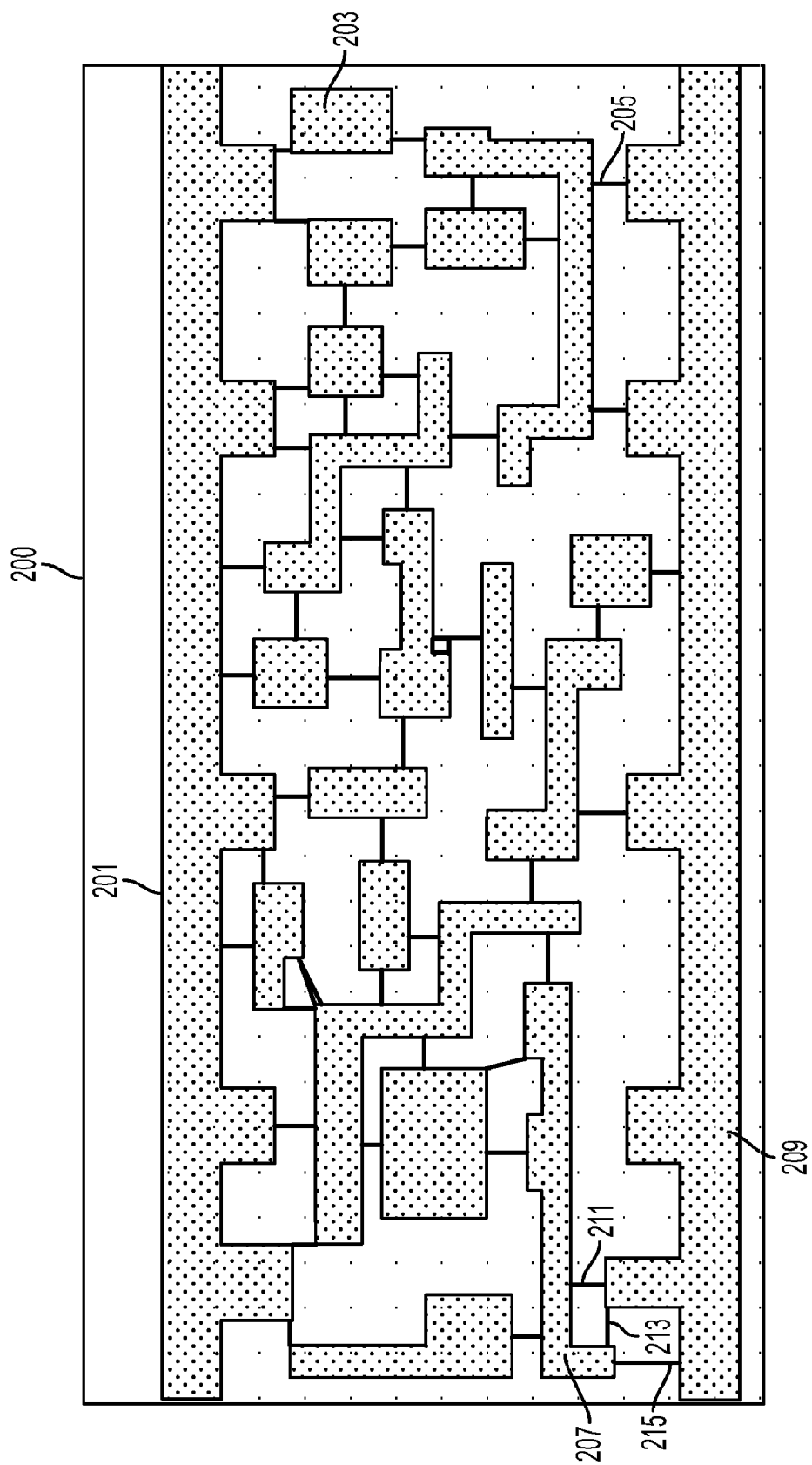
FIG. 3 is a layout with highlighted G0-spaces.

FIG. 3 shows a layout 200 for a particular layer in an integrated circuit. The layout includes various features such as 201, 203, 207, and 209. The features may be portions of interconnects in a particular metal layer. G0-spaces are highlighted, in some embodiments, using a line between the violating elements, shown as 205, 211, 213, and 215.

Among all G0-spaces shown, a designer must select a number of G0-spaces to fix. A G0-space may be fixed by changing a pattern dimension or moving patterns. Fixing a G0-space usually takes time, because changing the layout in one layer affects layout in other layers. The fix also can increase the total space of the layout, such as when the fix is accomplished by moving patterns further apart. Such fixes can increase device size and possibly affecting the total number of die that can fit on one wafer. In order to minimize the time spent and size of the layout, it is desirable to reduce the number of G0-space fixes. Further, the selection of G0-space to fix has different effectiveness in achieving a 2-colorable layout. Fixing some G0-spaces can even have the opposite effect of increasing the total number of fixes to achieve a 2-colorable layout. The present disclosure describes methods and systems to effectively select a number of G0-spaces to achieve a 2-colorable layout. In one aspect, some embodiments of the present invention provides a method to produce a 2-colorable layout using a minimum number of G0-space fixes, which can correspond to the layout that uses the least space.

Figure 4C:
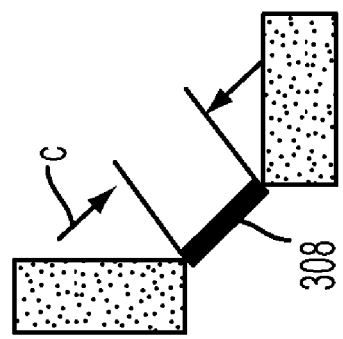
FIGS. 4A to 4C show G0 rules used in an exemplary embodiment to identify patterns too close to be formed using a single mask.
Figure 4B:
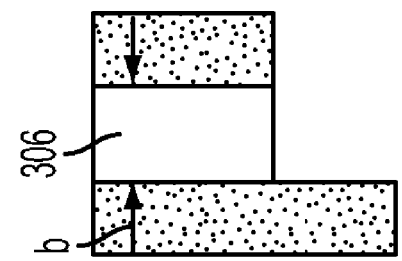
Figure 4A:
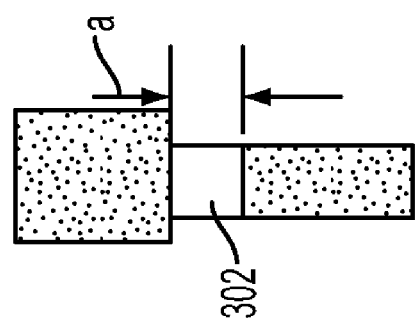

FIGS. 4A-4C define a set of G0 rules for determining whether a given set of patterns can be used in a DPT compliant routing pattern according to some embodiments. The parameter G0 is derived as a function of the minimum line spacing. FIGS. 4A to 4C show an example of a set of definitions of relevant line spacing criteria, given a minimum line spacing S defined by the routing grid. The minimum spacing S is a parameter of a particular process technology node. Criteria are applied to determine whether a given spatial relationship between two of the patterns in a routing layout would create a G0-space. For a region of the layout surrounded by a plurality of patterns, DPT may be possible if the number of G0 spaces surrounding the region of the layout is an even number. On the other hand, a 2-colorable layout is not achieved if the number of G0 spaces surrounding the region of the layout is an odd number.

In FIG. 4A, the G0-rule for end-end or end-run space is shown. A "G0 space" is formed in an area 302, for which the end-end or end-run distance is less than a parameter X times a minimum spacing S, or X*S. For example, if the distance is greater than 2.1*S (X=2.1), then these two patterns do not form a G0 space between them. If the distance is between 5 and 2.1*S, then a G0 space 302 is formed as shown in FIG. 4A. Note that the multiplier X may be different depending on a number of variables, for example, the wavelength of the lithographic radiation, the type of mask, etc. An even number of G0 spaces around a given region of the layout can nevertheless result in a 2-colorable layout. Thus a G0 space is formed when an end-to-end distance between two of the plurality of segments which are aligned with each other, or between two of the additional patterns which are aligned with each other, or between one of the plurality of segments and one of the additional patterns aligned therewith, to at least X times a minimum line spacing used between pairs of adjacent lines. Also, a G0 space is formed when an end-to-run distance between two of the plurality of segments which are unconnected and perpendicular to each other, or between two of the additional patterns which are unconnected and perpendicular to each other, or between one of the plurality of segments and one of the additional patterns which are unconnected and perpendicular to each other, to at least X times a minimum line spacing used between pairs of adjacent lines.

FIG. 4B shows the G0-rule for run-run space. A "G0 space" is formed in an area 306, for which the run-run distance is less than a parameter Y times a minimum spacing S, or Y*S. If the distance is greater than 1.6*S (Y=1.6), then these two patterns do not form a G0 space between them. If the distance is between 5 and 1.6*S, then an even number of G0 spaces around a given region of the layout can nevertheless result in a 2-colorable layout. Thus, a G0 space is formed if a run-to-run distance between two of the plurality of segments which are parallel to each other, or between two of the additional patterns which are parallel to each other, or between one of the plurality of segments and one of the additional patterns which are parallel to each other and extend, to at least Y times a minimum line spacing used between pairs of adjacent lines.

FIG. 4C shows the G0-rule for corner-corner space. A "G0 space" is formed in an area 308, for which the corner-corner distance is less than a parameter Z times a minimum spacing S, or Z*S. If the distance is greater than 1.6*S (Z=1.6), then these two patterns do not form a G0 space between them. If the distance is between 5 and 1.6*S, then an even number of G0 spaces around a given region of the layout can nevertheless result in a 2-colorable layout. Thus, a G0 space is formed when a corner-to-corner distance between two of the plurality of segments which are unconnected and perpendicular to each other, or between two of the additional patterns which are unconnected and perpendicular to each other, or between one of the plurality of segments and one of the additional patterns which are unconnected and perpendicular to each other, to at least Z times a minimum line spacing used between pairs of adjacent lines.

The descriptions of FIGS. 4A-4C above are non-limiting examples. Different technologies may use different threshold values for identifying a G0-space, including different S values and multipliers X, Y, and Z. That is, in other embodiments, the threshold distance may differ from 1.6*S or 2.1*S (e.g., 1.8*S, 2.4*S, or the like). In some embodiments, the G0 threshold may be a constant number regardless of the minimum spacing S. In other embodiments, the G0 threshold may use the same multiple of S (e.g., 2.1*S) for all types of spacing. In still other embodiments, alternate or additional examples of G0-space may be identified, such where a layout includes lines that are not either perpendicular or parallel to each other.

Figure 5:
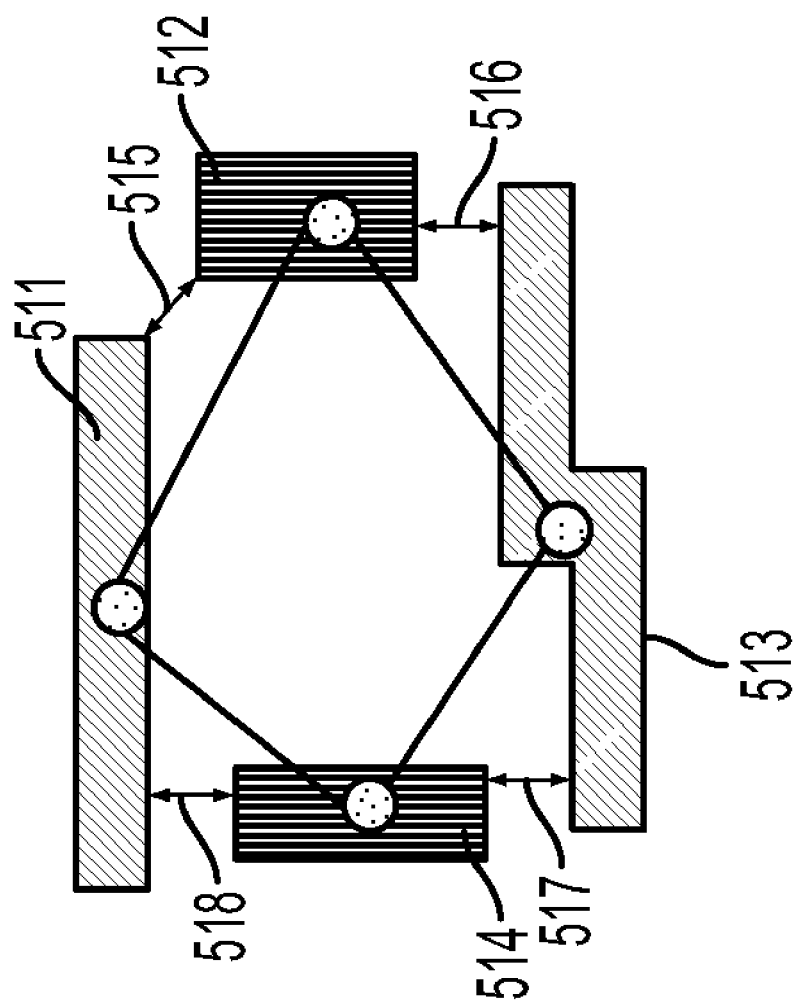
FIG. 5 shows layout patterns that form an even cycle loop.

As discussed, an odd-cycle loop is not 2-colorable, but an even-cycle loop is. A loop is where the G0-spaces among polygons form a cyclic sequence. As described above, patterns across a G0-space should be split into different masks. Because the odd-cycle loop has a number of polygons that cannot be split into two masks, it has a native conflict, or a G0-rule violation. FIG. 5 shows a four-pattern loop. The patterns are 511, 512, 513, and 514 through four G0-spaces 515, 516, 517, and 518. Working though the loop clock wise, patterns 511 and 512 should be separated into two masks because they have G0-space 515 between them. For example, pattern 511 is assigned to mask A (hatch pattern) and pattern 502 assigned to mask B (vertical pattern). Similarly, patterns 512 and 513 should be separated into two masks because they have G0-space 516 between them. Because pattern 512 is assigned to mask B, then 513 should be assigned to mask A. Again, patterns 513 and 514 should be separated into two masks because they have G0-space 517 between them. Because pattern 513 is already assigned to mask A, then 514 should be assigned to mask B. Lastly, patterns 514 and 511 should be separated into two masks because they have G0-space 518 between them. Because pattern 514 is assigned to mask B, then 511 should be assigned to mask A, which it already is. Thus, the loop as shown in FIG. 5 is 2-colorable, or separable into two masks. FIG. 5 includes four patterns, forming an even-loop. Whenever G0-spaces form an even loop, the patterns can be separated into two masks and is 2-colorable.

Figure 6:
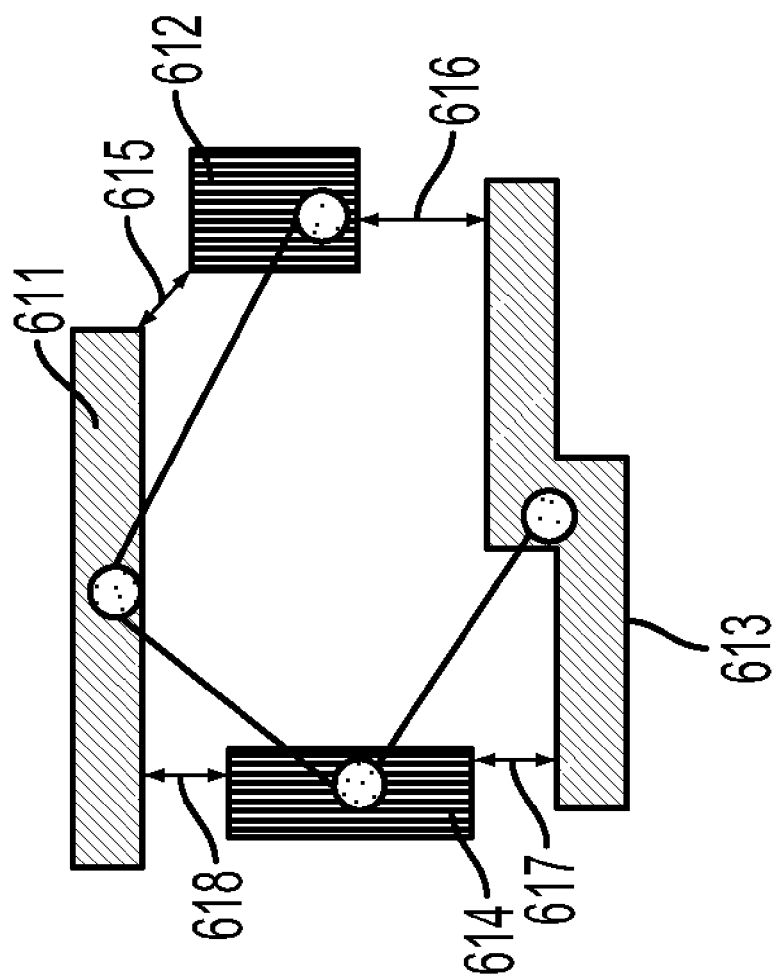
FIG. 6 shows layout patterns that form a non-loop.

In some cases, the relations of G0-spaces do not form a cyclic sequence. The arrangement of patterns is referred to as a non-loop, as shown in FIG. 6. FIG. 6 shows patterns 611, 612, 613, and 614 with G0-spaces 615, 617, and 618. The space 616 between patterns 612 and 613 is not a G0-space because the distance between the patterns exceeds X*S, as described above in relation to FIG. 4A. The patterns and G0-spaces in FIG. 6 do not form a cyclic sequence because not all legs of the imaginary polygon are G0-spaces. Thus, the patterns form a non-loop. Non-loops are not G0-rule violations no matter how many legs they have because they can always be separated into two masks.

Figure 7B:
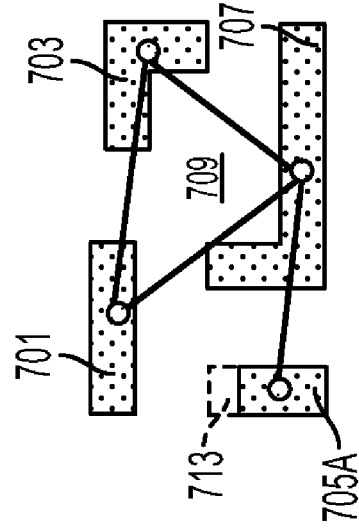
FIGS. 7A to 7D show a double odd-loop layout and ways to fix the layout in accordance with some embodiments.
Figure 7D:
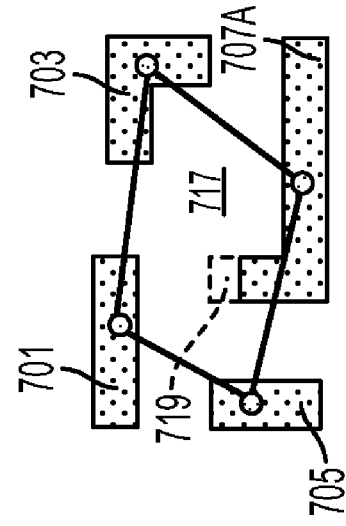
Figure 7A:
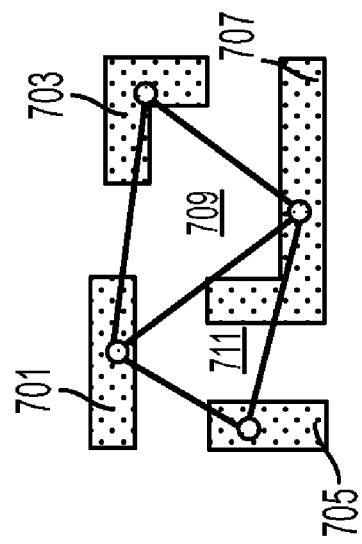
Figure 7C:
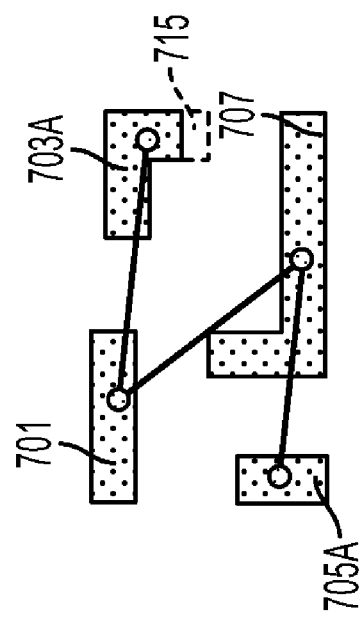

FIGS. 7A-7D show two different methods to resolve, or fix, a G0-rule violation involving double odd-loops. FIG. 7A shows four patterns 701, 703, 705, and 707 forming two three-loops 709 and 711. The odd-loop 709 is formed by patterns 701, 703, and 707. The odd-loop 711 is formed by patterns 701, 705, and 707. Between each consecutive pattern in the loop is at least one G0-space. FIGS. 7B and 7C show one way to fix the odd-loops of FIG. 7A. In FIG. 7B, the G0-space between 701 and 705 of FIG. 7A is fixed by removing a portion 713 of the pattern 705, forming 705A, which has a reduced area. While this fix made the odd-loop 711 into a non-loop as shown in FIG. 7B, the odd-loop 709 remains. The odd-loops 709 and 711 completely resolved in FIG. 7C when a portion 715 of pattern 703 is removed to increase the distance between 703 and 707, removing the G0-space between 703A and 707 as a result. Thus, the two odd-loops 709 and 711 of FIG. 7A becomes a non-loop of FIG. 7C, which is easily separated into two masks.

A different way to fix the G0-rule violation of FIG. 7A involves removing a portion 719 of pattern 707 as shown in FIG. 7D. Instead of making a non-loop as in FIG. 7C, an even-loop 717 is created by removing the G0-space between 701 and 707. As discussed above, an even-loop is also easily separated into two masks. By focusing the fix on a different pattern, the technique of FIG. 7D resolved the G0-rule violation by changing one pattern instead of two patterns as shown in FIGS. 7B and 7C. Because its fixing resolved the G0-rule violation, the G0-space between 701 and 707 is identified as a critical G0-space in accordance with some embodiments of the present invention. Identifying the critical G0-space to a designer for fixing reduces the total number of fixes required to resolve a 2 odd-loops layout.

Figure 8B:
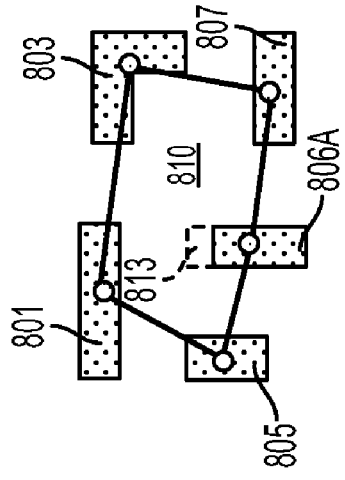
FIGS. 8A to 8D show a layout having an odd-loop and an even-loop and ways to fix the layout in accordance with some embodiments.
Figure 8D:
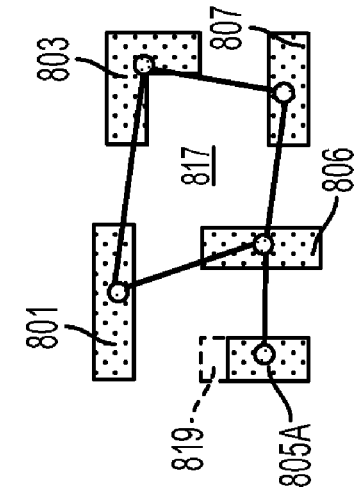
Figure 8A:
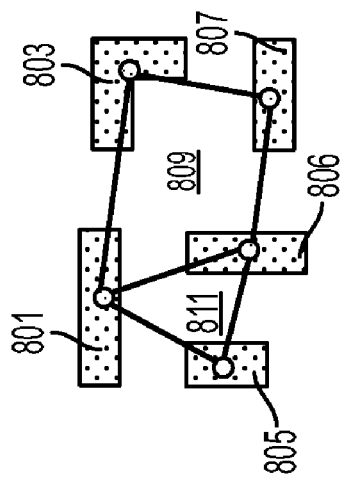
Figure 8C:
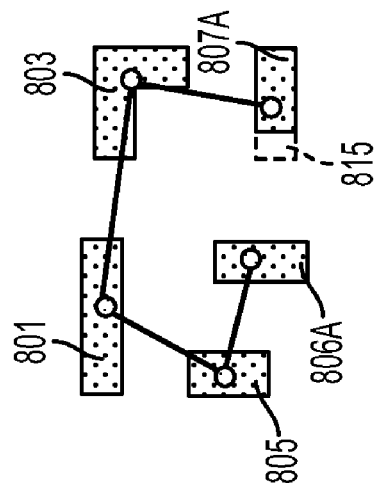

FIGS. 8A-8D show two different methods to resolve, or fix, a G0-rule violation involving an odd-loop and an even-loop. FIG. 8A shows four patterns 801, 803, 805, 806, and 807 forming two loops, an even-loop 809 and an odd-loop 811. The odd-loop 811 is formed by patterns 801, 805, and 806. The even-loop 809 is formed by patterns 801, 803, 807, and 806. Between each consecutive pattern in the loop is at least one G0-space. FIGS. 8B and 8C show one way to fix the loops of FIG. 8A. In FIG. 8B, the G0-space between 801 and 806 of FIG. 8A is fixed by removing a portion 813 of the pattern 806, forming 806A, which has a reduced area. While this fix removed the odd-loop 811, it created an even larger odd loop 810 having 5 patterns. The odd-loop 810 resolves by removing a portion 815 of the pattern 807, forming 807A, as shown in FIG. 8C. Finally, the even and odd loops of FIG. 8A are resolved into a non-loop, which is easily separated into two masks. Note that although the odd-loop is resolved by reducing the dimensions of pattern 807, changing the dimensions of any of the patterns of loop 810 to remove any G0-space would resolve the loop 810.

A different way to fix the G0-rule violation of FIG. 8A involves removing a portion 819 of pattern 805 as shown in FIG. 8D. Instead of making a non-loop as in FIG. 8C, an even-loop 817 plus a non-loop segment is created by removing the G0-space between 801 and 805. As discussed above, an even-loop is easily separated into two masks. By focusing the fix on a different pattern (805, instead of 806 and then 807), the technique of FIG. 8D resolved the G0-rule violation by changing one pattern instead of two patterns as shown in FIGS. 8B and 8C. Because its resolution fixed the G0-rule violation, the G0-space between 801 and 805 is identified as a critical G0-space in accordance with some embodiments of the present invention. Note that in the case of an odd-loop and an even-loop layout, fixing the G0-space between the loops does not resolve the layout. Thus the identification of a critical G0-space depends on the type of loops surrounding the G0-space. Fixing such critical G0-space reduces the total number of fixes required to solve such layout involving an odd-loop and an even-loop.

Figure 9:
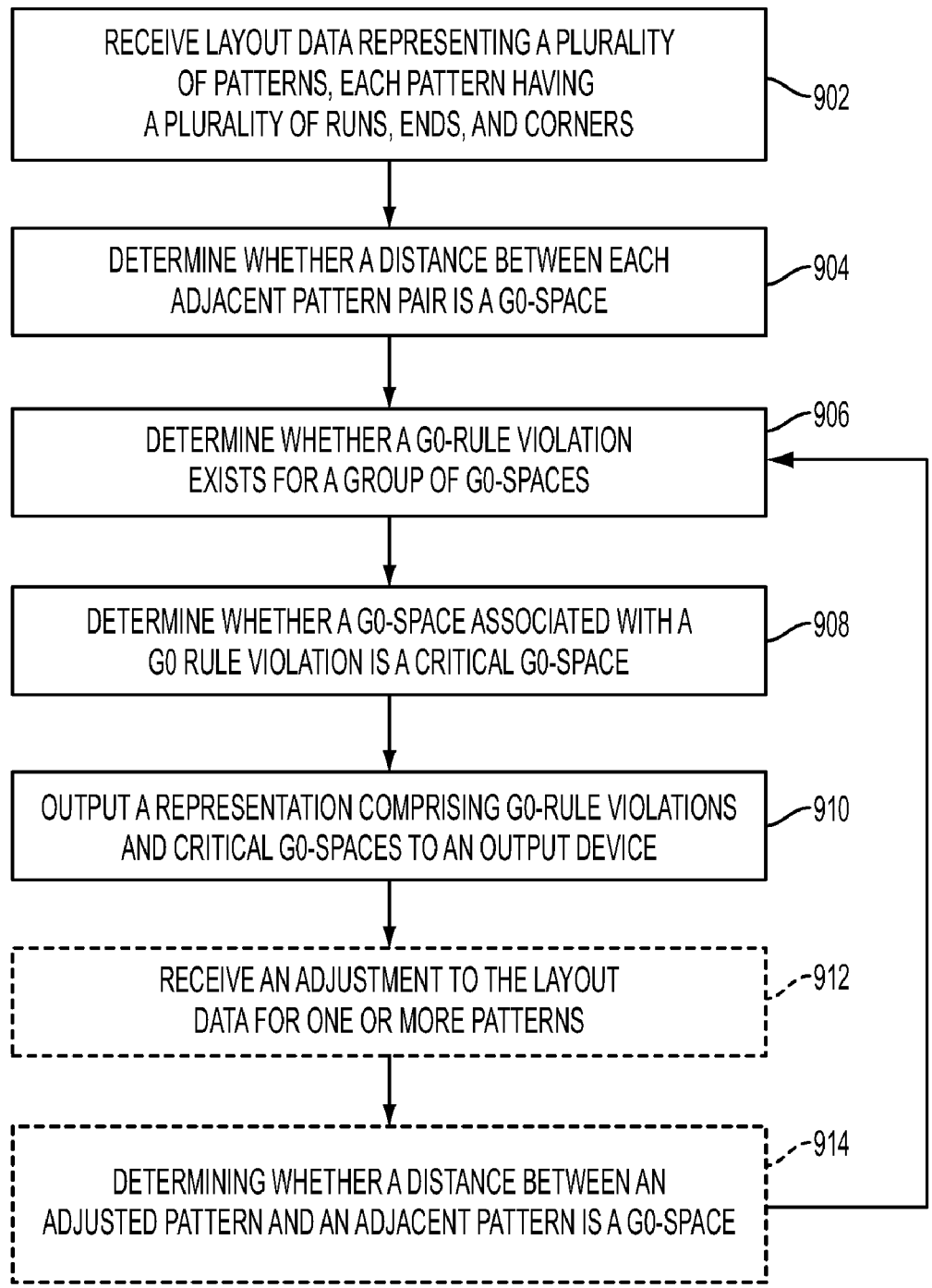
FIG. 9 is a flow chart for a method in accordance with some embodiments.

FIG. 9 is a flow chart of a circuit layout method in accordance with some embodiments. In operation 902, layout data representing a plurality of patterns is received. The layout data includes information about each pattern such as runs, ends, and corners locations and sizes. The layout data may include a number of layers having different patterns that may be connected through the layers. The layout data may be generated by an electronic design automation (EDA) tool such as Synphony from Synopsis, Virtuoso from Cadence Systems, and IC Station from Mentor Graphics. The layout data may be provided using a computer readable medium using a standard layout format such as GDSII. The layout data may also be provided directly through software interface when the method is executed by an EDA system.

In operation 904, the G0-spaces in the layout are determined. Various distances between pattern elements of adjacent patterns are compared to specified G0-space rules. The specified G0-space rules may be entered in the form of a DRC deck with the layout data. In addition to G0-space rules, the DRC deck may include special instructions on how to represent data, special rules, specific calculations, and warnings. For example, the distance between a run of one pattern and a run of an adjacent pattern may be 60 nm, but the G0-space rule may specify less than 65 nm for G0-space. Then the run-run space between these two patterns is a G0-space. In some embodiments, the G0-space rules include run-run/run-end, end-end, and corner-corner. The G0-space rules may also include other spatial relationships defined as being a G0-space. As disclosed above, the G0 distances specified may be different or same of each type of distance.

Once all the G0-spaces are identified, then the G0-rule violations are determined for the identified G0-spaces in operation 906. According to some embodiments, the G0-rule violation is an odd-loop, a contiguous group of G0-spaces forming a polygon across an odd number of patterns. However, other G0-rule violation may be defined. An example may be when G0-spaces overlap, i.e., a corner-corner G0-space crossing over another corner-corner G0-space.

In operation 908, critical G0-spaces are determined from the G0-spaces forming the G0-rule violations. Critical G0-spaces includes G0-spaces between two odd-loops, or between two G0-rule violations. Critical G0-spaces may also include G0-spaces between an odd loop and a non-loop. For an odd-loop that does not have an adjacent odd-loop, but does have an adjacent even-loop, the critical G0-space may be a G0-space that is not shared with the even-loop. As discussed above, critical G0-spaces are those whose fixing would aid in the resolution of the layout pattern to be 2-colorable. A designer may spend a lot of time fixing G0-spaces only to realize that they are not critical because odd-loops still exist. By determining the critical G0-space to fix using the methodology disclosed, the design rule checker (DRC) presents the designer with a mapping of effective fixes.

Figure 11A:
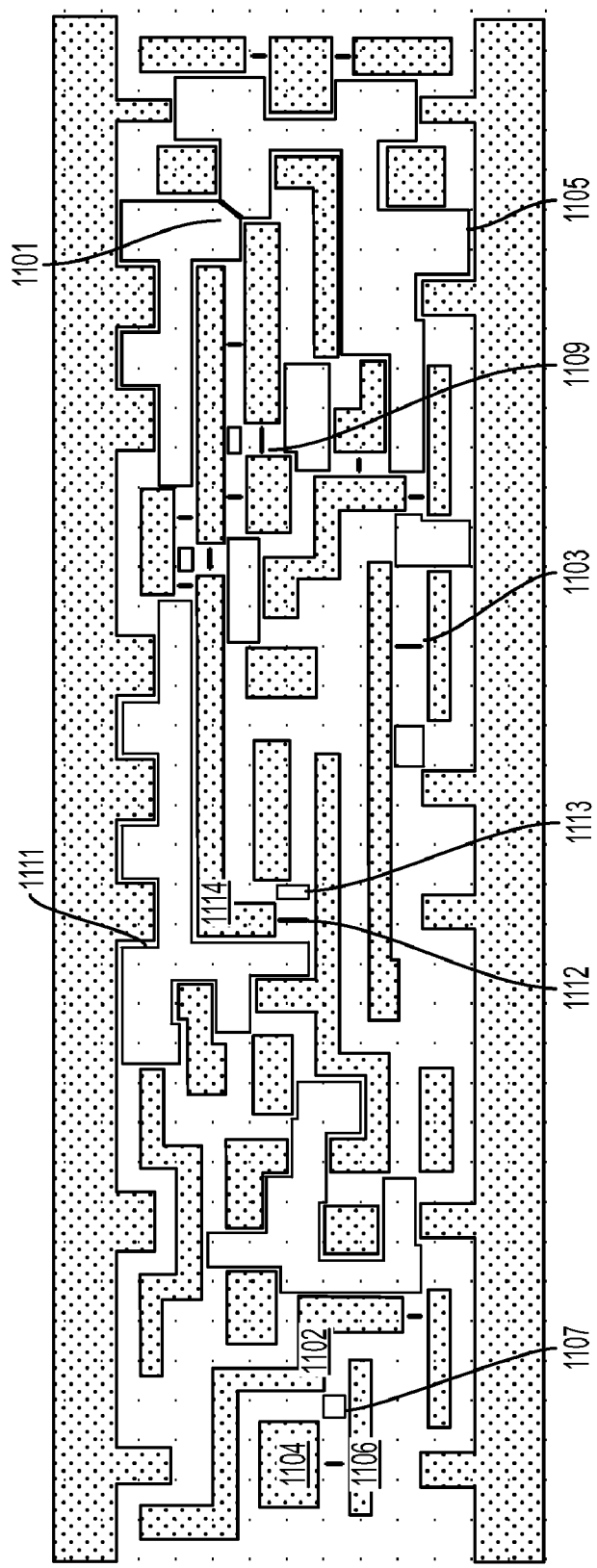
FIGS. 11A to 11B are example outputs using a method in accordance with some embodiments.

In operation 910, a representation of G0-rule violations and critical G0-spaces is outputted to an output device. FIG. 11A is an example of such an output in accordance with some embodiments. FIG. 11A shows the circuit layout having G0-rule violations and critical G0-spaces. The G0-rule violations are highlighted by a polygon next to patterns and pattern elements forming G0-spaces, such as G0-rule violations 1105, 1113, 1107, and 1111. The G0-rule violations may include odd-loops having a few or many patterns: the G0-rule violation 1107 is an odd-loop of three patterns 1102, 1104, and 1106, but the G0-rule violation 1105 is an odd-loop of thirteen patterns. FIG. 11A also shows critical G0-spaces as a line between the pattern elements meeting the G0-space criteria. Examples include 1101, a corner to corner G0-space, 1103, a run-run G0-space, and 1109, an end-end G0-space.

The representations may be sent to a machine-readable storage medium, i.e., memory, such as a memory chip, a disk and/or a drive or to a display device, such as a monitor or a printer. Although FIG. 11A shows a particular way of highlighting G0-rule violations and critical G0-spaces on a layout diagram, other techniques to highlight G0-rule violations and critical G0-spaces may be used. For example, the patterns belonging to a G0-rule violation may be highlighted. Further, other types of representation may be used, including non-graphical representations listing the G0-rule violations and critical G0-spaces.

Figure 11B:
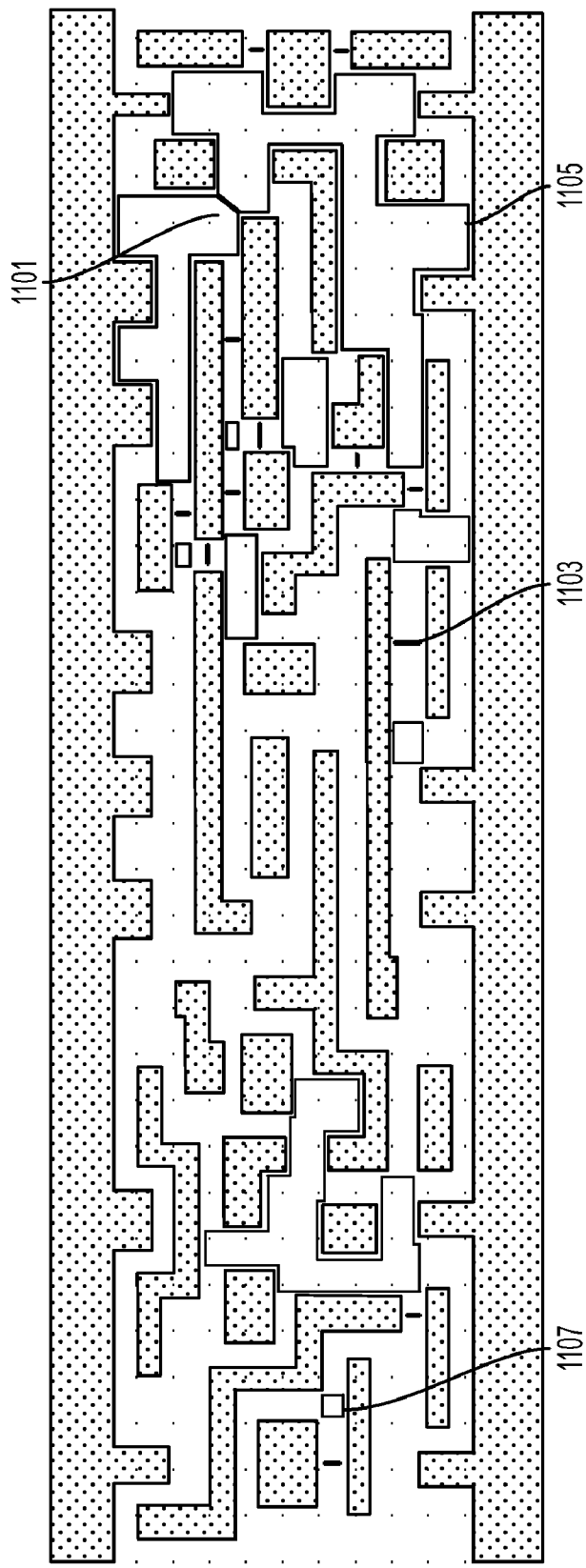

Using the output, a designer can decide which critical G0-spaces to fix. FIGS. 11A and 11B show an example of the before and after output of one such fix. A designer may choose to fix G0-space 1112 between G0-rule violations 1111 and 1113. FIG. 11B shows the result of fixing the G0-space 1112 by reducing the area of pattern 1114. After the G0-space is fixed, the G0-rule violations 1111 and 1113 disappear.

When more than one G0-space can be critical G0-spaces between the two G0-rule violations, both may be represented in the output. For example, two odd-loops may share two G0-spaces. Both of the shared G0-spaces may be indicated as critical G0-spaces. A designer can then choose which one to fix depending on the layout constraints. One G0-space may be easier than another to fix if the associated pattern does not reach many adjacent layers or if space around it is available to move into. In this situation only one critical G0-space need be fixed.

Referring back to FIG. 9, the designer may optionally enter an adjustment to the layout data for one or more patterns in operation 912. The adjustment corresponds to the G0-space fix or fixes. The adjustment may be received by the DRC in the form of typed entry, mouse click, or changed memory. The DRC then determines whether a distance between an adjusted pattern and an adjacent pattern is a G0-space in operation 914. If not, then operations 906 to 910 repeat to determine what the new G0-rule violations and G0-spaces are and to output the result representation. The process may repeat until no G0-rule violation is determined.

According to certain embodiments, when an adjustment is entered for a pattern that affects patterns in other layers, the DRC may propagate the adjustment to adjacent layers until all affected layers are adjusted. For example, a designer may choose to reduce a pattern area and enters this adjustment on one layer. However, the pattern is a trench that is physically connected to vias in adjacent layers. Then the vias should be moved or removed and any further interconnect that the vias connect to must also be moved or reshaped. In other embodiments, the DRC would rely on the designer to manually enter adjustments for all affected layers. The DRC may also issue warnings that the adjustment causes a misalignment of other patterns on other layers and highlight those.

Figure 10:
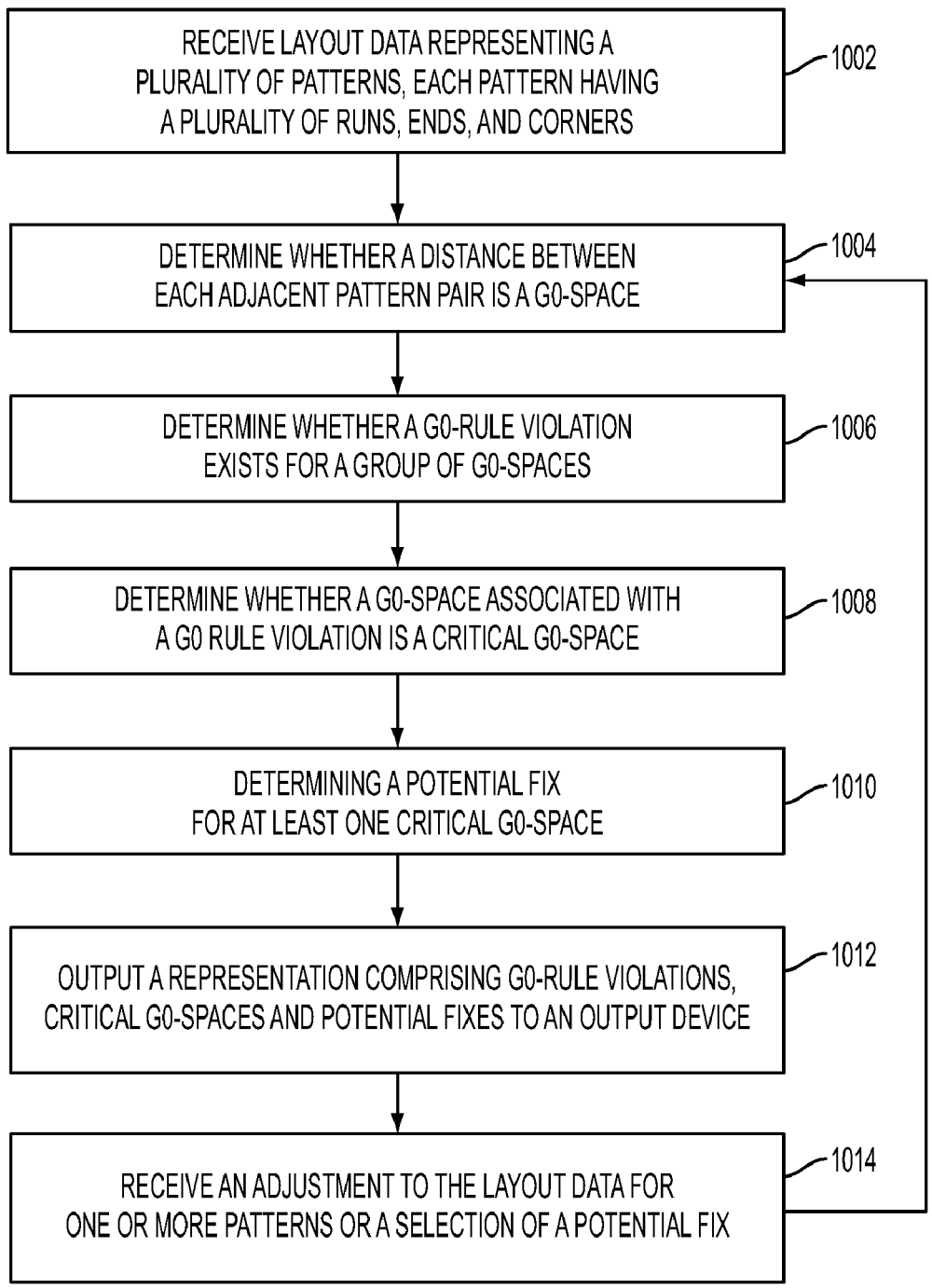
FIG. 10 is a flow chart for a method in accordance with some embodiments.

FIG. 10 shows a process flow for a method in accordance with some embodiments. Similar to the process in FIG. 9, layout data representing a plurality of patterns, each pattern having a plurality of runs, ends, and corners, is received, in operation 1002. The DRC then finds all the G0-spaces between the pattern elements by comparing the layout with specified values, in operation 1004. Then the G0-spaces are analyzed to determine the G0-rule violations, in operation 1006. Using the G0-rule violations, critical G0-spaces are found in operation 1008. The DRC then determines a potential fix for at least one critical G0-space in operation 1010. The potential fix may include moving one or more patterns or reducing an area of a pattern. If reducing an area of a pattern affects layout of patterns on adjacent layers, the change to patterns on other layers should be included. In operation 1012, a representation comprising G0-rule violations, critical G0-spaces and potential fixes is outputted to an output device, for example, a monitor. The output may resemble that of FIG. 11A, except that when a critical G0-space is selected, for example, by a mouse click, a potential fix listing would appear requesting a selection. A designer may choose to apply a potential fix from the list. When the designer chooses a potential fix, the DRC receives an adjustment to the layout data for one or more patterns or a selection of a potential fix, as shown in operation 1014. This selection is then used to re-determine the G0-spaces, G0-rule violations, and critical G0-spaces in operations 1004, 1006, and 1008. The process would iterate until all critical G0-spaces are fixed and no G0-rule violation is found.

Figure 12A:
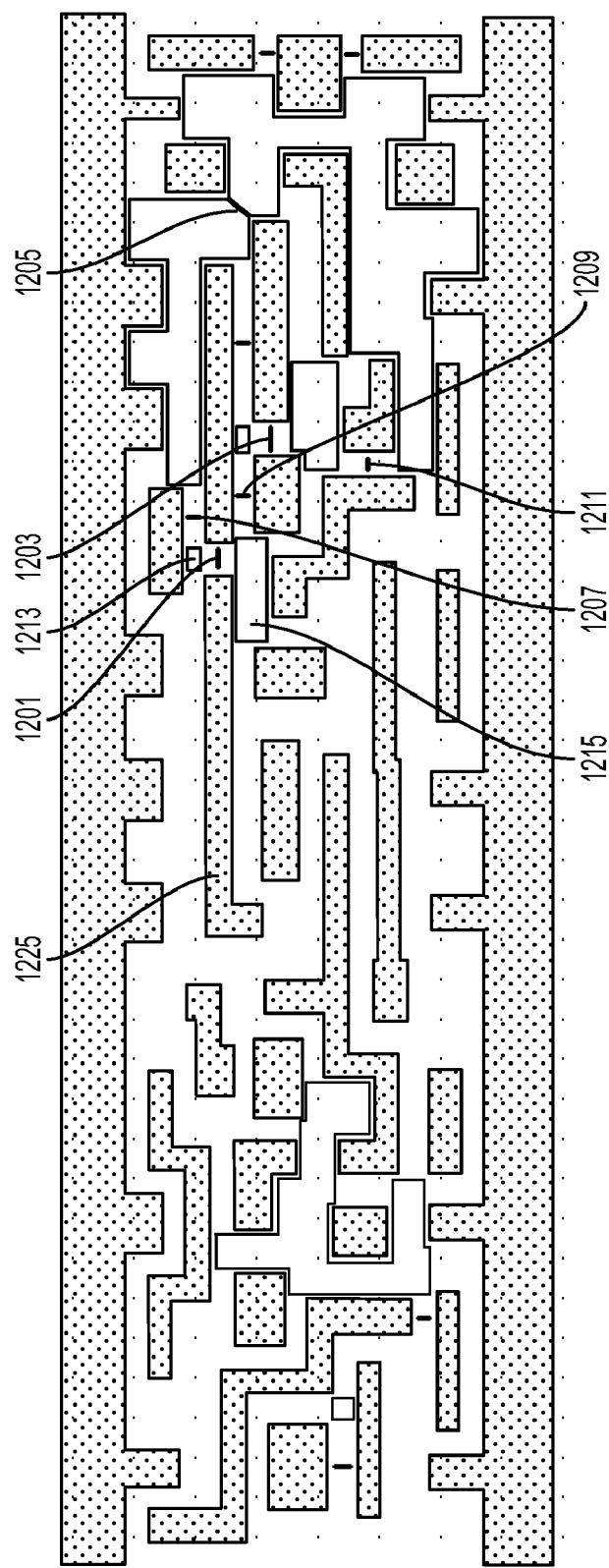
FIGS. 12A to 12D are example outputs using a method in accordance with some embodiments.
Figure 12B:
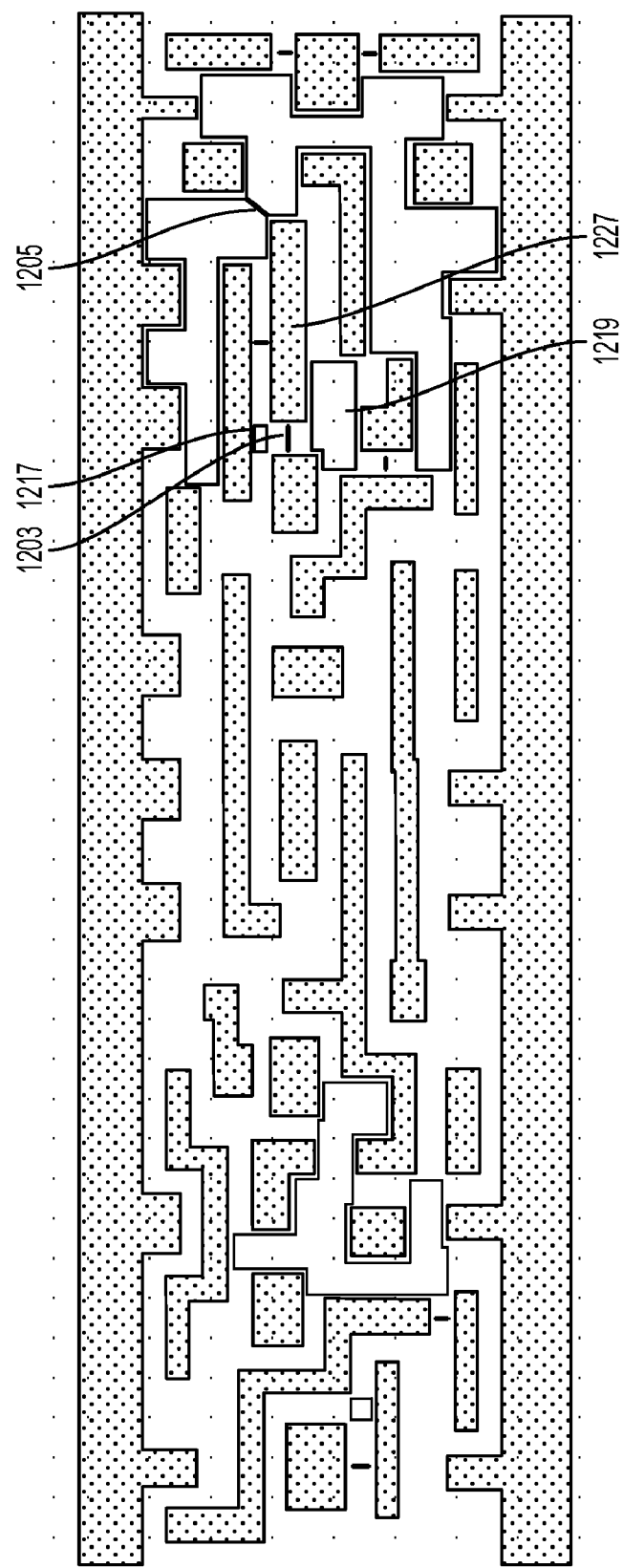
Figure 12C:
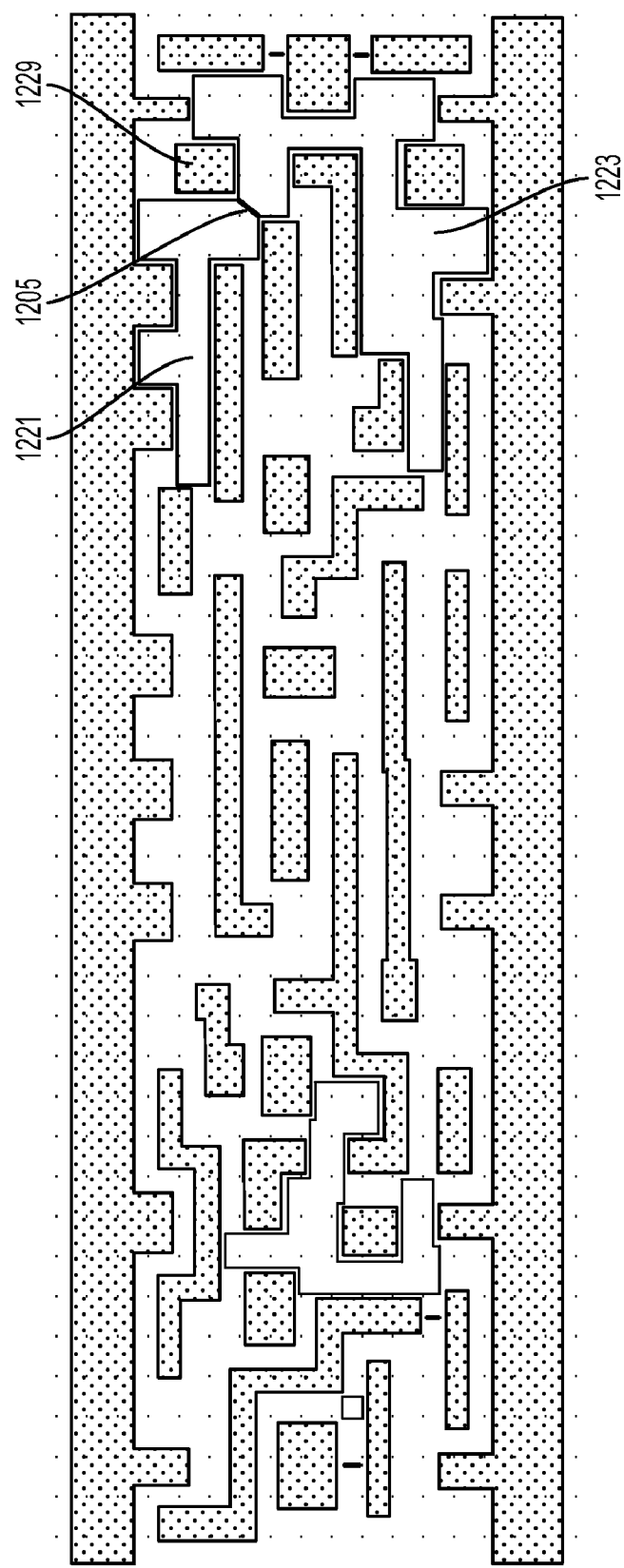

FIGS. 12A to 12D shows some example iterations of the method in accordance with some embodiments. FIG. 12A is a layout diagram showing various G0-rule violations, for example, 1213 and 1215, and critical G0-spaces, for example, 1201-1211. In order to resolve G0-rule violations 1213 and 1215, critical G0-space 1201 may be fixed, by reducing the area of pattern 1225. After critical G0-space 1201 is fixed, G0-rule violations 1213 and 1215 disappear when the layout is checked again, as shown in FIG. 12B. FIG. 12B includes G0-rule violations 1217 and 1219 with critical G0-space 1203 between them. FIG. 12C depicts the results when G0-space 1203 is fixed by reducing the area of 1227. Note that although these examples involve fixing the critical G0-spaces by reducing pattern area for one pattern, in practice other methods may be used. Other methods may include moving one or more patterns and changing the shape of one or more patterns.

Figure 12D:
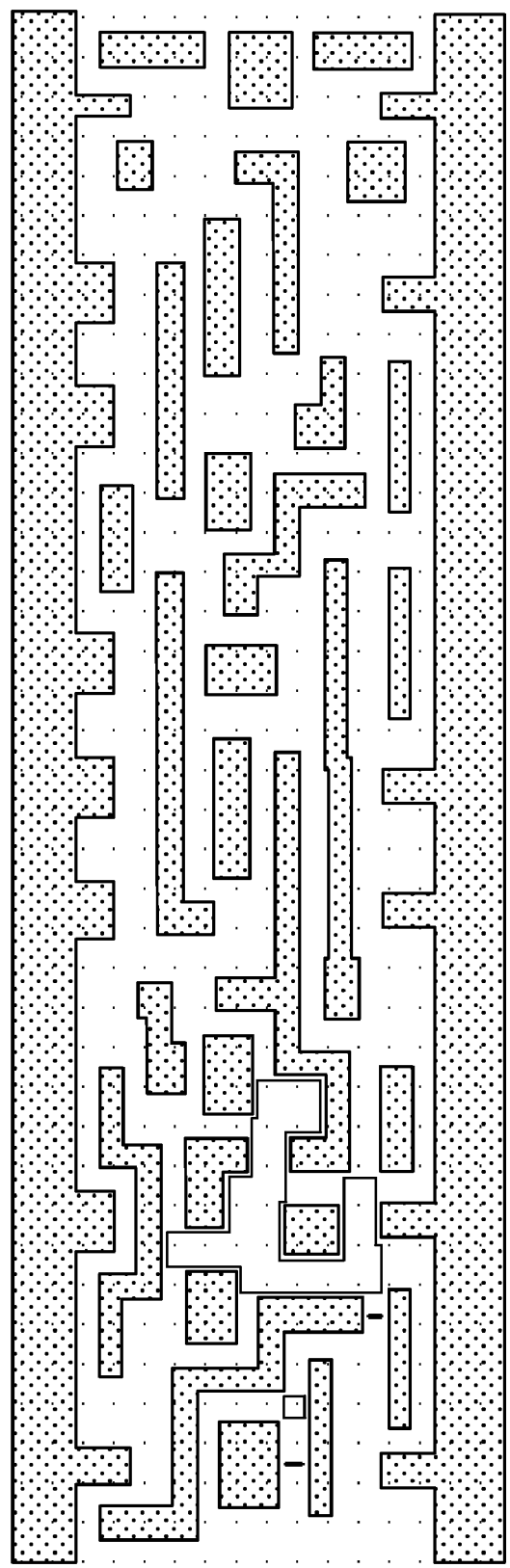

FIG. 12C includes G0-rule violations 1221 and 1223 with critical G0-space 1205 between them. FIG. 12D depicts the results when G0-space 1205 is fixed by reducing the area of 1229. In FIG. 12D, the entire right side of the layout is clear of G0-rule violations and critical G0-spaces after resolving three critical G0-spaces 1201, 1203, and 1205. Note that FIG. 12A showed other critical G0-spaces 1207, 1209, and 1211 that disappeared as the critical G0-spaces 1201, 1203, and 1205 are fixed. Critical G0-spaces 1207, 1209, and 1211 may be considered as alternatives to critical G0-spaces 1201, 1203, and 1205 because only one set of critical G0-spaces need be fixed. A designer can choose to fix one set of critical G0-spaces over another set of critical G0-spaces depending on difficulty. The methods and systems disclosed herein allow a designer to have flexibility in choosing how to fix a number of G0-rule violations among efficient alternatives.

In one aspect according to some embodiments, the present disclosure pertains to a system for checking design rules. The system includes a computer readable storage medium, a processor coupled to read the storage medium, and an output device. The processor may be part of a special purpose computer for design rule checking configured to perform various methods as disclosed herein. The computer readable storage medium may include one or more of dynamic random access memory (RAM), SDRAM, a read only memory (ROM), EEPROM, a hard disk drive (HDD), an optical disk drive (CD-ROM, DVD-ROM or BD-ROM), or a flash memory, or the like. The output device may be a display, a printer, or the computer storage medium. The system may further include an input device for entering the layout data and/or adjustment to the layout data during one or more iterative resolution of the layout. Using the system, a designer may inputting layout data representing a plurality of patterns, each pattern having a plurality of runs, ends, and corners, specify a plurality of G0-space distance criteria corresponding to a distance between run and run of pattern pairs, run and end of pattern pairs, end and end of pattern pairs, and corner and corner of pattern pairs, review a representation of G0-space and G0 rule violations; and, input an adjustment to the layout data.

Although the embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit layout method of forming two masks for a plurality of patterns, said method comprising:
   receiving layout data representing the plurality of patterns, each pattern having a plurality of runs, ends, and corners;
   for each pair of adjacent patterns, determining, by a processor of a computer system, whether a distance between the pair of adjacent patterns is a G0-space;
   for the G0-space, determining, by the processor, whether a G0-rule violation exists;
   determining, by the processor, whether a G0-space associated with the G0-rule violation is a critical G0-space that, if removed, merges two adjacent odd-loops of G0-spaces into a single even-loop of G0-spaces or converts one odd-loop of G0-spaces to a non-loop of G0-spaces; and
   outputting a representation comprising the G0-rule violation and the critical G0-space.

2. The circuit layout method of claim 1, wherein the outputting the representation comprises displaying the G0-rule violation and the critical G0-space on a display device.

3. The circuit layout method of claim 1, further comprising:
receiving an adjustment to the layout data;
determining whether another critical G0-space exists between an adjusted pattern and one or more patterns adjacent to the adjusted pattern; and
outputting a representation comprising the another critical G0-space.

4. The circuit layout method of claim 3, wherein the layout data comprise a plurality of layers and the adjustment corresponds to patterns in one layer of the layout, and
the method further comprises propagating the adjustment to adjacent layers.

5. The circuit layout method of claim 1, further comprising:
determining a potential fix for at least one critical G0-space;
receiving a selection of the potential fix; and
outputting a potential fix representation comprising the G0-rule violation and the critical G0-space incorporating the potential fix.

6. The circuit layout method of claim 5, wherein outputting the potential fix representation comprises displaying the potential fix representation on a display device.

7. The circuit layout method of claim 5, wherein determining the potential fix includes reducing a pattern area or moving a pattern.

8. The circuit layout method of claim 1, wherein determining whether a distance between the pair of adjacent patterns is a G0-space comprises comparing a distance between a run and a run of the pair of adjacent patterns, a run and an end of the pair of adjacent patterns, an end and an end of the pair of adjacent patterns, and a corner and a corner of the pair of adjacent patterns to a set of specified values.

9. The circuit layout method of claim 1, wherein determining whether a G0-rule violation exists comprises determining whether an odd-loop of G0-spaces exists.

10. The circuit layout method of claim 1, wherein determining the critical G0-space comprises determining if the G0-space is shared by two odd-loops of G0-spaces.

11. The circuit layout method of claim 1, wherein determining the critical G0-space comprises determining if the G0-space belongs to an odd-loop of G0-spaces and is not shared by other odd-loops of G0-spaces or an even-loop of G0-spaces.

12. The circuit layout method of claim 1, further comprising
receiving a design rule check (DRC) deck, said deck comprising design rules for double patterning technology (DPT).

13. The circuit layout method of claim 1, wherein the outputting comprises outputting the representation to a machine readable storage medium.

14. A system for forming two masks for a plurality of patterns comprising:
a computer readable storage medium containing layout data representing an integrated circuit (IC) layout, said layout comprising patterns having a plurality of runs, ends, and corners; and
a processor coupled to read the storage medium, the processor configured for:
determining whether a distance between each pair of adjacent patterns is a G0-space;
determining whether a G0-rule violation exists for a group of G0-spaces, said G0-spaces in a group forming a loop;
determining whether a G0-space associated with a G0-rule violation is a critical G0-space that, if removed, merges two adjacent odd-loops of G0-spaces into a single even-loop of G0-spaces or converts one odd-loop of G0-spaces to a non-loop of G0-spaces; and
outputting a representation comprising the G0-rule violation and the critical G0-space to an output device; and
the output device.

15. The system of claim 14, wherein the output device is a display device, a printer, or the computer readable storage medium.

16. The system of claim 14, wherein the computer readable storage medium further contains a design rule check (DRC) deck.

17. The system of claim 14, further comprising an input device for receiving an adjustment to the layout data for one or more patterns.

18. The system of claim 17, wherein the processor is further configured for:
determining whether a distance between an adjusted pattern and a pattern adjacent to the adjusted pattern is a G0-space.

19. The system of claim 17, wherein the processor is further configured for:
determining a potential fix for the critical G0-space;
outputting the potential fix to the output device;
receiving a selection of the potential fix from the input device;
determining a potential fix representation comprising the G0-rule violation and the critical G0-space incorporating the potential fix; and
outputting the potential fix representation to the output device.

20. A non-transitory computer readable storage medium encoded with computer program code such that, when the computer program code is executed by a processor, the processor performs a circuit layout method comprising:
receiving layout data representing a plurality of patterns;
determining whether a distance between each pair of adjacent patterns is a G0-space;
determining whether a G0-rule violation exists for a group of G0-spaces;
determining whether a G0-space associated with a G0-rule violation is a critical G0-space that, if removed, merges two adjacent odd-loops of G0-spaces into a single even-loop of G0-spaces or converts one odd-loop of G0-spaces to a non-loop of G0-spaces; and
outputting a representation comprising the G0-rule violation and the critical G0-space to an output device.

21. A circuit layout method comprising:
inputting, using an input device of a computer system, layout data representing a plurality of patterns;
specifying, using the input device of the computer system, a plurality of G0-space distance criteria corresponding to a distance between adjacent patterns;
reviewing, using an output device of the computer system, a representation comprising a G0-rule violation and a critical G0-space that, if removed, merges two adjacent odd-loops of G0-spaces into a single even-loop of G0-spaces or converts one odd-loop of G0-spaces to a non-loop of G0-spaces; and
inputting, using the input device of the computer system, an adjustment to the layout data for the critical G0-space.

* * * * *